Patented June 30, 1936

2,045,741

UNITED STATES PATENT OFFICE 2,045,741

PROCESS OF FORMING A PLASTIC PRODUCT FROM CRACKING COIL TAR

Carl Winning and Robert M. Thomas, Elizabeth, N. J., assignors to Standard Oil Development Company, a corporation of Delaware No Drawing. Application May 14, 1932, Serial No. 611,432

3 Claims. (Cl. 196—22)

This invention relates to a method for preparing improved plastic compositions from the tarry residuum obtained on cracking petroleum oils. According to our invention we treat cracked petroleum tars with aluminum chloride and obtain as a product a plastic composition superior to the asphaltic and pitchy constituents originally in the tar. Our invention will be fully understood from the following description of a method suitable for preparing this plastic composition.

A tar obtained as a residual fraction in cracking a petroleum gas oil at elevated temperatures and pressures is agitated at 150° C. with 5% by weight of anhydrous aluminum chloride. The agitation and heating are continued for about two hours. The sludge is then allowed to settle and the supernatant oil layer is withdrawn and is distilled, yielding tar oil as a distillate and, as distillation residue a dark plastic body. This product is resinous and pitchy in nature and may be a thick highly viscous semi-plastic material or a hard and brittle solid, depending upon the extent to which it is stripped of oil fractions by the distillation. For example, the latter product may be secured by conducting the distillation to an end point of about 600° F. at 1 to 10 mm. absolute pressure.

Cracked petroleum tars contain resinous and asphaltic plastic substances originally present in the crude or formed in the cracking process from which the tar is secured. The tar also contains highly reactive substances. The plastics naturally occurring in the petroleum or formed on cracking may be separated from these highly reactive substances only with extreme difficulty and hence are normally unstable due to the presence of such highly reactive substances. These substances are no longer apparent in the products of our process. The resulting plastic products are accordingly of much greater stability and show less tendency to undergo subsequent changes than do the resinous and asphaltic products normally separated from crude or cracked petroleum oils.

The treatment of cracked petroleum tar with aluminum chloride is preferably conducted at a sufficiently elevated temperature to insure reaction of the unstable compounds of the tar, but insufficiently elevated to cause appreciable cracking of the tar with formation of lower boiling liquid or gaseous products. The preferred temperature range is from about 100 to 180° C., although the treatment may be conducted at atmospheric or even lower temperatures. Somewhat higher temperatures above 180° C., may be used if the treatment is conducted under sufficient pressure to prevent vaporization of the aluminum chloride. The amount of aluminum chloride required is determined to some extent by the stability and other characteristics of the tar treated. Generally from 1 to 10% by weight of aluminum chloride based on the tar treated will be found sufficient.

The yield and quality of the plastic product may be increased by addition of unsaturated hydrocarbons during the treatment of the tar with aluminum chloride. Vapor phase cracked naphtha may be added to the aluminum chloride tar mixture before heating, or a gas containing unsaturated hydrocarbons, such as the fixed gas from a cracking coil, may be passed into the heated aluminum chloride tar mixture during the reaction.

The aluminum chloride tar mixture should be sufficiently fluid to permit thorough agitation during the reaction and for the resulting sludge to settle. The fluidity of this mixture may be controlled by the viscosity of the cracked tar used or by the addition of a diluent such as varnolene, a water white petroleum naphtha of high flash boiling in the kerosene range. Such diluents may be added either before or after the reaction and in the latter case represent an effective method for obtaining the rapid separation of the sludge.

The plastic composition as obtained in our process is suitable for many uses; for example, it may be used in paving, roofing, pipe covering and other surface coating plastic compositions. For such purposes it may be applied molten, as a solution in a volatile hydrocarbon or other suitable vehicle, or as an emulsion. It may also be used in the preparation of moulded shingles, in floor covering compositions, in electrical insulation, and as an adhesive; for example, on friction tape. It may be used by itself or as a binder with a more or less inert filler, as a component of paints and varnishes together with a drying oil, as a component of nitrocellulose lacquers and as a component of rubber compositions. The particular softening point and hardness required for each use may be controlled by the extent to which the removal of oily constituents in the final distillation is effected.

This invention is not to be limited to any specific examples, which are given solely for purpose of illustration, but only by the following claims, in which we wish to claim all novelty insofar as the prior art permits.

We claim:

1. Method for preparing a plastic composition comprising treating cracked petroleum tar with aluminum chloride, adding a volatile cracked petroleum product containing unsaturated hydrocarbons during said treatment, causing the resulting sludge to settle, separately withdrawing the resulting supernatant oil layer, distilling said oil and recovering as distillation residue said plastic product.

2. Method according to claim 1 in which the added unsaturated hydrocarbons comprise gaseous olefines.

3. Method according to claim 1 in which the added unsaturated hydrocarbons comprise vapor phase cracked naphtha.

CARL WINNING.
ROBERT M. THOMAS.